United States Patent
Benais

(10) Patent No.: US 10,746,281 B2
(45) Date of Patent: Aug. 18, 2020

(54) GEARBOX AND RELATED BOGIE

(71) Applicant: ALSTOM TRANSPORT TECHNOLOGIES, Saint-Ouen (FR)

(72) Inventor: Cyrille Benais, Saint Firmin (FR)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 115 days.

(21) Appl. No.: 16/026,375

(22) Filed: Jul. 3, 2018

(65) Prior Publication Data

US 2019/0011035 A1 Jan. 10, 2019

(30) Foreign Application Priority Data

Jul. 4, 2017 (FR) ...................... 17 56296

(51) Int. Cl.
*F16H 57/04* (2010.01)
*F16H 1/20* (2006.01)

(52) U.S. Cl.
CPC ......... *F16H 57/0421* (2013.01); *F16H 1/203* (2013.01); *F16H 57/045* (2013.01); *F16H 57/0457* (2013.01); *F16H 57/0495* (2013.01)

(58) Field of Classification Search
CPC .. F16H 57/0421; F16H 57/0457; F16H 1/203; F16H 57/045; F16H 57/0495; F16H 2057/02043; F16H 2057/02086
See application file for complete search history.

(56) References Cited

U.S. PATENT DOCUMENTS

| | | | |
|---|---|---|---|
| 1,220,811 A | 3/1917 | Alquist | |
| 1,714,509 A * | 5/1929 | Kemble | B60G 5/02 |
| | | | 184/13.1 |
| 2,244,225 A * | 6/1941 | Strehlow | F16H 57/04 |
| | | | 184/11.1 |
| 3,847,249 A * | 11/1974 | Oehring | F16H 57/0421 |
| | | | 184/6.12 |
| 9,909,660 B2 * | 3/2018 | Toaso, Jr. | B60K 17/344 |

FOREIGN PATENT DOCUMENTS

| | | | |
|---|---|---|---|
| EP | 0294697 A1 * | 12/1988 | ............. F16H 57/03 |
| EP | 0811521 A1 | 12/1997 | |
| FR | 2106978 A5 | 5/1972 | |

OTHER PUBLICATIONS

Preliminary Search Report dated Mar. 20, 2018 during the prosecution of FR1756296.

* cited by examiner

*Primary Examiner* — Thomas C Diaz

(74) *Attorney, Agent, or Firm* — Troutman Pepper Hamilton Sanders LLP

(57) ABSTRACT

The invention relates to a gearbox including a first shaft, a second shaft, an intermediate shaft transmitting the movement from the first shaft to the second shaft and a casing delimiting a chamber, the first shaft and the second shaft each extending at least partially outside the casing, the intermediate shaft being accommodated in the chamber and comprising a first gearing element cooperating with the first shaft and a second gearing element cooperating with the second shaft.

The first shaft and the intermediate shaft are arranged at a first height, the second shaft being arranged at a second height lower than the first height, and the gearbox includes a splash tub containing a lubricant, the first gearing element being at least partially submerged in the splash tub.

9 Claims, 2 Drawing Sheets

GEARBOX AND RELATED BOGIE

CROSS-REFERENCE TO RELATED APPLICATIONS

The present application claims priority from French Patent Application No. FR 17 56296 filed on Jul. 4, 2017, the entire contents of which are hereby incorporated by reference.

TECHNICAL FIELD

The present invention relates to a gearbox. The present invention also relates to a bogie comprising such a gearbox.

BACKGROUND

Gearboxes are integrated into a large number of mechanical systems, to transmit a movement between two parts rotating at different speeds, i.e., to establish a speed ratio different from 1 between the two parts. In particular, such gearboxes frequently connect a motor to an axle driven by the motor, for example in railway vehicle cars.

Gearboxes frequently comprise an input shaft, an output shaft and an intermediate shaft transmitting a movement from the input shaft to the output shaft, these shafts cooperating with one another via gears arranged to establish the speed ratio different from 1. In order to provide as efficient a transmission of energy as possible, the gears of the gearbox are generally lubricated with a liquid such as an oil.

However, many geometric constraints weigh on the gearboxes. For example, the bulk of the other elements of the mechanical system in which the gearbox is integrated frequently requires that the input and output shafts be perpendicular to one another, or that the input and output shafts be arranged at different heights.

Known from document FR 2,106,978 A5 is a device for transmitting a force between a motor and an axle, this device comprising shafts arranged at different heights relative to the ground. However, the shafts are distributed in two separate casings so as to allow relative movement of the motor and the axle, and the shafts received in a same casing are arranged at different heights from one another. This device therefore has large dimensions, in particular in the vertical direction.

Also known is a gearbox in which the input shaft is located at a height greater than that of the output shaft, the output shaft being perpendicular to the input shaft. The intermediate shaft is perpendicular to the output shaft and connected thereto by a conical gear. Conical gears are particularly susceptible to the appearance of friction, and therefore require more effective lubrication than other types of gears, such as spur gearings.

In order to provide effective lubrication of the conical gear, the gearing element carried by the output shaft bathes in an oil reserve located in the lower part of a casing housing the shafts and the gears of the gearbox. Thus, when the gearbox is operating, the gearing element of the output shaft drives the oil to the conical gear, which is thus lubricated.

The oil reserve being located in the lower part of the casing, the oil sprayed on the walls of the casing is recovered by gravity, which makes it possible to ensure that the oil reserve is not completely emptied during operation.

However, gearboxes of this type are only appropriate, due to their geometry and bulk, for certain applications. In particular, they have a significant width in a horizontal plane at the output shaft, and therefore the axle of a railway vehicle bogie in which they are integrated.

SUMMARY OF THE INVENTION

There is therefore a need for a gearbox having, in its lower part, a reduced bulk relative to the gearboxes of the state of the art.

To that end, the invention relates to a gearbox for transmitting a movement from a motor to an element driven by the motor, the gearbox including a first shaft and a second shaft, one of which is intended to be connected to the motor and the other of which is intended to be connected to the element driven by the motor, the gearbox further including an intermediate shaft transmitting the movement from the first shaft to the second shaft and a casing delimiting a chamber, the first shaft and the second shaft each extending at least partially outside the casing, the intermediate shaft being accommodated in the chamber and comprising a first gearing element cooperating with the first shaft and a second gearing element cooperating with the second shaft.

The first shaft and the intermediate shaft are arranged at a first height relative to a bottom of the chamber, the second shaft being arranged at a second height relative to the bottom of the chamber, the second height being lower than the first height, and the gearbox includes a first splash tub containing a lubricant, the first gearing element being at least partially submerged in the first splash tub.

Owing to the invention, the gearbox has a small width in its lower part, while allowing effective lubrication of the gear between the first shaft and the intermediate shaft, although this gear is separated from the bottom of the casing.

According to other advantageous aspects of the invention, the gearbox comprises one or more of the following features, considered alone or according to any technical possible combination:

- The first shaft and the second shaft extend in directions substantially perpendicular to one another, the intermediate shaft extending in a direction substantially parallel to that of the second shaft.
- The first gearing element is a conical ring meshing on a conical pinion of the first shaft.
- The casing includes a reserve tub in fluid communication with the first splash tub and containing lubricant.
- The reserve tub is in fluid communication with the first splash tub through at least two conduits each extending along a conduit axis, the angle between the two conduit axes being greater than or equal to 60 degrees.
- The reserve tub is in fluid communication with the first splash tub through at least one conduit, the conduit having a diameter smaller than or equal to 20 millimeters.
- The casing includes at least one trough configured to collect the lubricant sprayed on the walls of the casing by the rotation of the first shaft and the intermediate shaft and to transmit the collected lubricant to the first splash tub.
- The second shaft includes a third gearing element meshing on the second gearing element, the gearbox including a second splash tub containing lubricant and in which the third gearing element is at least partially submerged, the first splash tub being configured to supply lubricant to the second splash tub by overflow.
- The gearbox further includes a deflector inserted between the first gearing element and the walls of the casing, the deflector at least partially surrounding the first gearing element and being configured to collect at least part of the lubricant sprayed by the first gearing element during the rotation of the intermediate shaft and transmit the collected lubricant to the first splash tub.

The invention also relates to a railway vehicle motor bogie including an axle, a motor and a gearbox configured to transmit a movement from the motor to the axle, the gearbox being as defined above, the first shaft being connected to the motor and the second shaft being connected to the axle.

BRIEF DESCRIPTION OF THE DRAWINGS

Other aspects and advantages of the invention will appear upon reading the following description, provided solely as a non-limiting example, and done in reference to the appended drawings, in which.

DETAILED DESCRIPTION

Figure 1:
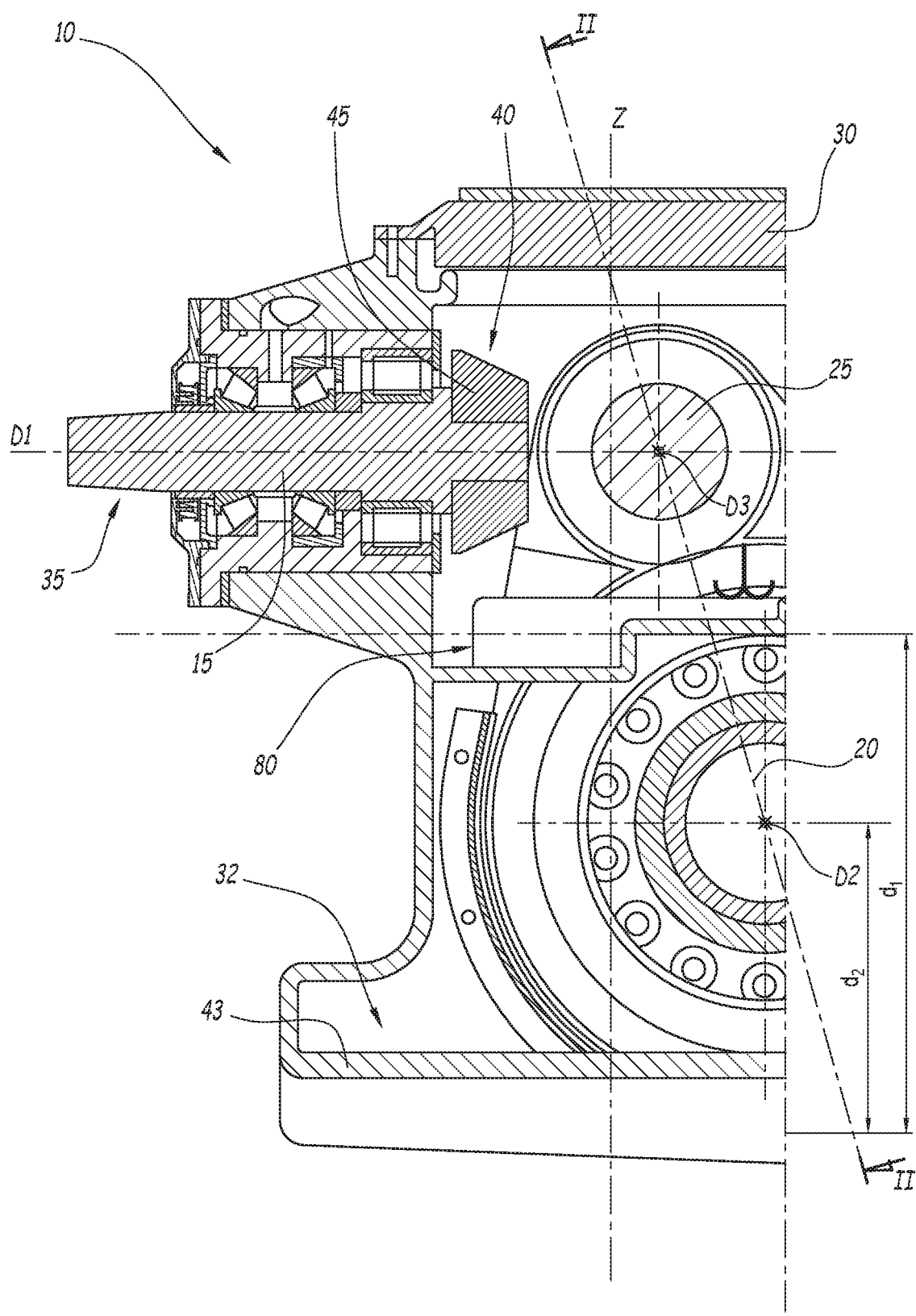
FIG. 1 is a sectional view in a vertical plane of an example gearbox according to the invention.

A gearbox 10 is shown in FIG. 1. The gearbox 10 is integrated into a vehicle, such as a railway vehicle. For example, the gearbox 10 is part of a motor bogie of the railway vehicle.

The gearbox 10 is arranged to transmit a movement between a motor of the vehicle and an element driven by the motor. For example, the element driven by the motor is an axle of the bogie.

The gearbox 10 comprises a first shaft 15, a second shaft 20, an intermediate shaft 25, and a casing 30 delimiting a chamber 32.

An elevation direction Z is defined for the gearbox 10. The elevation direction Z corresponds to a vertical direction when the gearbox 10 is integrated into a bogie and the bogie is operating flat, i.e., arranged on substantially horizontal rails. The terms "lower" and "upper", "above" and "below" are defined according to the elevation direction Z. The heights are measured according to the elevation direction Z.

One shaft among the first shaft 15 and the second shaft 20 is intended to be connected to the motor, and the other shaft 15, 20 is intended to be connected to the axle driven by the motor.

According to the example of FIG. 1, the first shaft 15 is connected to the motor and the second shaft 20 is connected to a wheel of the vehicle or to a driving device of the wheel. According to one alternative, the first shaft 15 is connected to the element driven by the motor and the second shaft 20 is connected to the motor.

The first shaft 15 extends at least partially outside the casing 30. The first shaft 15 has a first end 35 and a second end 40.

The first shaft 15 extends in a first direction D1 between the first end 35 and the second end 40. The first direction D1 is perpendicular to the elevation direction Z.

The first shaft 15 is for example cylindrical with a circular base around a first axis. The first axis is combined with the first direction D1.

The first shaft 15 is arranged at a first height d1 from a bottom 43 of the chamber 32. The first height d1 is for example measured between the bottom of the chamber 32 and the first axis, in the elevation direction Z. The bottom means the lowest lower wall of the casing delimiting the chamber 32.

The first height d1 is for example comprised between 450 millimeters (mm) and 550 mm, for example equal to 490 mm.

The first end 35 is located outside the casing 30. The first end 35 is connected to the motor, for example by a gear.

The second end 40 is accommodated in the chamber 32. The second end 40 includes or bears a first gearing element 45.

The first gearing element 45 is for example a conical pinion.

The second shaft 20 extends at least partially outside the casing 30. The second shaft 20 is connected to an axle or forms part of one axle of a vehicle bogie. The second shaft 20 is for example a shaft of a bogie axle.

The second shaft 20 extends in a second direction D2. The second direction D2 is perpendicular to the first direction D1 and to the elevation direction Z.

"Substantially perpendicular" means that an angle between the considered directions is equal to 90°, to within 10°.

"Substantially parallel" means that an angle between the considered directions is equal to 0°, to within 10°.

Figure 2:
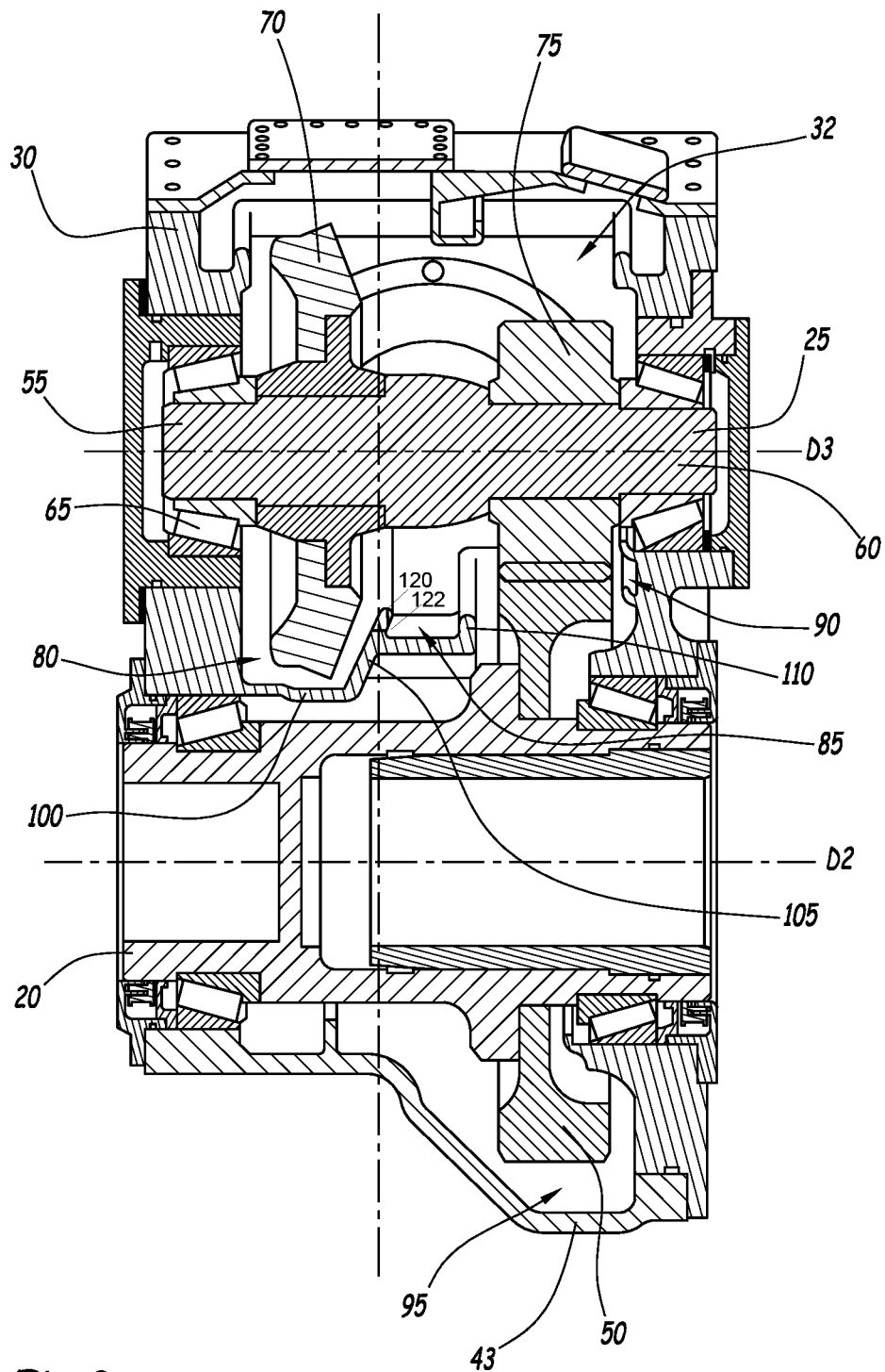
FIG. 2 is a sectional view of the gearbox along plane II-II of FIG. 1.

According to the example of FIG. 2, the second shaft 20 crosses all the way through the casing 30 in the second direction D2.

The second shaft 20 is for example cylindrical with a circular base around a second axis.

The second shaft 20 is arranged at a second height d2 from the bottom of the chamber 32. The second height d2 is strictly smaller than the first height d1. In other words, if one considers that the first shaft 15 is located at a first level, the second shaft 20 is arranged at a second level below the first level. The second height d2 is measured between the second axis and the bottom of the chamber 32. The second height d2 is for example comprised between 200 mm and 250 mm, for example equal to 225 mm. The difference between the first height d1 and the second height d2 is greater than or equal to 20 cm.

The second shaft 20 further includes or bears a second gearing element 50.

The second gearing element 50 is for example a toothed wheel. The second gearing element 50 is accommodated in the chamber 32.

The second gearing element 50 for example has helical teeth. According to one alternative, the second gearing element 50 has straight teeth.

The intermediate shaft 25 is accommodated in the chamber 32. For example, the intermediate shaft 25 has a third end 55 and a fourth end 60. Each of the third end 55 and the second end 60 is mounted freely rotating in the walls of the casing 30. According to one embodiment, the ends 55, 60 of the intermediate shaft 25 are mounted freely rotating in the walls of the casing 30 via rolling bearings 65.

The intermediate shaft 25 extends in a third direction D3. The third direction D3 is substantially perpendicular to the first direction D1 and to the elevation direction Z. The third direction D3 is thus substantially parallel to the second direction D2.

According to the example of FIG. 1, the intermediate shaft 25 is cylindrical with a circular base around a third axis. The first axis and the third axis are concurrent and coplanar.

According to this example, the intermediate shaft 25 is arranged at the first level, i.e., the intermediate shaft 25 is arranged at the first height d1 of the bottom of the chamber 32.

The second shaft 20 and the intermediate shaft 25 are superimposed in the elevation direction Z.

The intermediate shaft 25 is configured to transmit a movement from the first shaft 15 to the second shaft 20 via the first and second gearing elements, for example with a speed ratio different from 1.

The intermediate shaft 25 includes a third gearing element 70 and a fourth gearing element 75.

The third gearing element 70 is configured to cooperate with the first shaft 15. In particular, the third gearing element 70 meshes on the first gearing element 45.

The third gearing element 70 is for example a conical ring.

The numbers of teeth of the second and third gearing elements 45 and 70 are for example chosen to obtain a speed reducing ratio comprised between 1.5 and 5.

The third gearing element 70 is accommodated in the chamber 32.

According to one alternative, the first and third gearing elements 45 and 70 form a hypoid gearing and not a conical gearing, the first and third axes then being perpendicular but not concurrent.

The fourth gearing element 75 is accommodated in the chamber 32. The fourth gearing element 75 cooperates with the second shaft 20. In particular, the fourth gearing element 75 meshes on the second gearing element 50. According to one embodiment, the fourth gearing element 75 is a pinion with helical teeth.

The casing 30 is configured to isolate the outside of the casing 30 from the inside of the chamber 32. In particular, the casing 30 is configured to prevent lubricant from leaking from the inside of the chamber 32 toward the outside of the casing 30 or to prevent dust from entering from the outside of the casing 30 toward the inside of the chamber 32.

The casing 30 includes a first splash tub 80, a reserve tub 85, at least one trough 90, a second splash tub 95 and a deflector.

The first splash tub 80 is configured to contain a lubricant. The lubricant is for example an oil suitable for lubricating a gear drive. The first splash tub 80 is configured so that the third gearing element 70 is at least partially accommodated in the first splash tub 80. In other words, when the first splash tub 80 contains a lubricant, the third gearing element 70 is at least partially submerged in the lubricant contained in the first splash tub 80.

The first splash tub 80 has a first volume V1. The first volume V1 is comprised between 0.2 liters and 0.6 liters, for example equal to 0.4 liters.

The first splash tub 80 is inserted between the third gearing element 70 and the second shaft 20 in the elevation direction Z.

According to the example of FIG. 2, the first splash tub 80 is delimited by a wall of the casing 30, a bottom 100 integral with the casing wall 30 and a first peripheral partition 105.

The bottom 100 is inserted between the second shaft 20 and the third gearing element 70 in the elevation direction Z.

The first peripheral partition 105 surrounds the first splash tub 80 at least partially in a plane perpendicular to the elevation direction Z. The first peripheral partition 105 then delimits the first splash tub 80 in a plane perpendicular to the elevation direction Z.

The first peripheral partition 105 is inserted between the third gearing element 70 and the fourth gearing element 75 in the third direction D3.

The reserve tub 85 is configured to contain lubricant.

The reserve tub 85 is inserted between the first splash tub 80 and the fourth gearing element 75 in the third direction D3. The reserve tub 85 is separated from the first splash tub 80 by the first peripheral partition 105. According to the example of FIG. 2, the reserve tub 85 is delimited, in the third direction D3, by the first peripheral partition 105 and by a second peripheral partition 110.

The reserve tub 85 is in fluid communication with the first splash tub 80, i.e., the reserve tub 85 is configured so the lubricant can circulate between the first splash tub 80 and the reserve tub 85.

The reserve tub 85 is in fluid communication with the first splash tub 80 through at least one conduit extending through the first peripheral partition 105. For example, the reserve tub 85 is in fluid communication with the first splash tub 80 through at least two conduits.

The reserve tub 85 surrounds the first splash tub 80 in a plane perpendicular to the elevation direction Z, at least partially.

The reserve tub 85 has a second volume V2. The second volume V2 is strictly larger than the first volume V1. The second volume V2 is comprised between 0.6 liters and 1 liter, for example equal to 0.8 liters.

The bottom of the reserve tub 85 is located at a higher height relative to the height of the bottom 100 of the splash tub 80 with respect to the bottom of the chamber.

Each conduit extends along a conduit axis.

An angle between the two conduit axes is greater than or equal to 60°. For example, the angle is equal to 90°, to within 10°.

According to one embodiment, a first conduit 120 is arranged in a portion of the first peripheral partition 105 perpendicular to the third direction D3 and extends along a conduit axis parallel to the third direction D3. A second conduit 122 is then arranged in a portion of the first peripheral partition 105 parallel to the third direction D3 and extends along a conduit axis perpendicular to the third direction D3.

Each conduit has a diameter. At least one of these diameters is less than or equal to 20 mm. For example, each conduit has a diameter of less than or equal to 20 mm.

The first splash tub 80 is configured to supply lubricant to the second splash tub 95 by overflow. According to one embodiment, the first splash tub 80 and the reserve tub 85 are configured to supply lubricant to the second splash tub 95 by overflow. In other words, the first splash tub 80 and the reserve tub 85 are configured so that any excess lubricant in the first splash tub 80 and the reserve tub 85 spills into the second splash tub 95.

According to the example of FIG. 2, the second peripheral partition 110 delimits an opening of the casing 30 traversed by the second gearing element 50. Thus, excess lubricant in the first splash tub 80 and the reserve tub 85 spills into the lower part of the casing 30 over the second peripheral partition 110.

Each trough 90 is configured to collect the lubricant sprayed on the walls of the casing 30 during the rotation of the first shaft 15 and the intermediate shaft 25. Each trough 90 is configured to transmit the collected lubricant to the first splash tub 80. For example, at least one trough 90 is configured to transmit the collected lubricant to the reserve tub 85, the lubricant next reaching the first splash tub 80 through the conduit.

Each trough 90 is arranged in a wall of the casing 30.

The second splash tub 95 is configured to contain lubricant. When the second splash tub 95 contains a lubricant, the second gearing element 50 is at least partially submerged in the lubricant contained in the second splash tub 95. The second splash tub 95 has a volume comprised between 4 liters and 6 liters, for example equal to 5 liters.

The second splash tub 95 is located in the lowest part of the chamber 32. The first height d1 and the second height d2 are measured from the bottom of the second splash tub 95, i.e., the bottom 43 of the second splash tub forms at least part of the bottom of the chamber.

The deflector is inserted between the third gearing element 70 and the walls of the casing 30. For example, the deflector at least partially surrounds the third gearing element 70.

The deflector is attached to the walls of the casing 30.

The deflector is configured to collect at least part of the lubricant sprayed by the third gearing element 70 during the rotation of the intermediate shaft 25.

The deflector is configured to transmit the collected lubricant to the first splash tub 80. For example, the deflector is located above the first splash tub 80.

According to one embodiment, the deflector comprises a cylindrical wall at least partially surrounding the third gearing element 70 in a plane perpendicular to the third direction D3. According to one alternative, the deflector includes a disc perpendicular to the third direction D3 and inserted between the third gearing element 70 and the fourth gearing element 75.

The deflector is for example made from a metal, such as steel.

The use of the splash tub 80 allows good lubrication of the conical gearing between the first shaft 15 and the intermediate shaft 25. Thus, the splash tub 80 makes it possible to place the conical gearing in the upper part of the gearbox 10 instead of the lower part. It is therefore possible to place the intermediate shaft 25 at a height higher than the height of the second shaft, and therefore to limit the bulk in the lower part of the gearbox 10.

The lubricant contained in the reserve tub 85 is less affected by the movement of the third gearing element 70 than the first splash tub 80. The reserve tub 85, due to its large capacity, forms a buffer zone that makes it possible to provide an effective resupply of lubricant for the splash tub 80.

The angle between the conduit axes of the various conduits makes it possible to prevent the disruptions caused, in the lubricant contained in the first splash tub, by the rotation of the third gearing element 70, from opposing the arrival of lubricant from the reserve tub 85. Indeed, if these disruptions limit the arrival by one of the conduits, the angle is fairly large so that the other conduit is not affected. Thus, the lubricant supply of the splash tub 80 is more effective, which therefore makes the gearbox 10 more reliable.

Furthermore, a conduit diameter of less than or equal to 25 mm also limits the spread of disruptions from the first splash tub 80 to the reserve tub 85, while providing a sufficient lubricant beginning.

The deflector also contributes to a better supply of the splash tub 80 with lubricant, since it collects a large portion of lubricant that would otherwise have been sprayed on the walls of the casing and would risk falling into the second splash tub 95. Thus, the lubrication of the conical gearing between the first shaft 15 and the intermediate shaft 25 is improved and the gearbox 10 is more reliable.

The example above has been described in the case of a conical gearing between the first shaft 15 and the intermediate shaft 25. It should be noted that other types of gearings can be used in conjunction with a splash tub 80 located in an upper part of the casing 30. For example, in a case where the three shafts 15, 20 and 25 are parallel to one another, straight teeth can be used.

The invention claimed is:

1. A railway vehicle motor bogie, comprising:
an axle,
a motor, and
a gearbox configured to transmit a movement from the motor to the axle, the gearbox comprising:
a first shaft and a second shaft, one of which is intended to be connected to the motor and the other of which is intended to be connected to the element driven by the motor,
an intermediate shaft transmitting the movement from the first shaft to the second shaft, and
a casing delimiting a chamber, the first shaft and the second shaft each extending at least partially outside the casing, the intermediate shaft being accommodated in the chamber and comprising a first gearing element cooperating with the first shaft and a second gearing element cooperating with the second shaft,
wherein the first shaft and the intermediate shaft are arranged at a first height relative to a bottom of the chamber, the second shaft being arranged at a second height relative to the bottom of the chamber, the second height being lower than the first height, and in that the gearbox includes a first splash tub containing a lubricant, the first gearing element being at least partially submerged in the first splash tub,
wherein the first shaft being connected to the motor and the second shaft being connected to the axle.

2. The railway vehicle motor bogie according to claim 1, wherein the first shaft and the second shaft extend in directions substantially perpendicular to one another, the intermediate shaft extending in a direction substantially parallel to that of the second shaft.

3. The railway vehicle motor bogie according to claim 1, wherein the first gearing element is a conical ring meshing on a conical pinion of the first shaft.

4. The railway vehicle motor bogie according to claim 1, wherein the casing includes a reserve tub in fluid communication with the first splash tub and containing lubricant.

5. The railway vehicle motor bogie according to claim 4, wherein the reserve tub is in fluid communication with the first splash tub through at least two conduits each extending along a conduit axis, the angle between the two conduit axes being greater than or equal to 60 degrees.

6. The railway vehicle motor bogie according to claim 4, wherein the reserve tub is in fluid communication with the first splash tub through at least one conduit, the conduit having a diameter smaller than or equal to 20 millimeters.

7. The railway vehicle motor bogie according to claim 1, wherein the casing includes at least one trough configured to collect the lubricant sprayed on the walls of the casing by the rotation of the first shaft and the intermediate shaft and to transmit the collected lubricant to the first splash tub.

8. The railway vehicle motor bogie according to claim 1, wherein the second shaft includes a third gearing element meshing on the second gearing element, the gearbox including a second splash tub containing lubricant and in which the third gearing element is at least partially submerged, the first splash tub being configured to supply lubricant to the second splash tub by overflow.

9. The railway vehicle motor bogie according to claim 1, wherein the casing from which the first height and the second height are measured comprises the first splash tub.

\* \* \* \* \*